UNITED STATES PATENT OFFICE.

HANS A. FRASCH, OF HAMILTON, CANADA.

PROCESS OF PRODUCING NICKEL SALTS.

SPECIFICATION forming part of Letters Patent No. 689,391, dated December 24, 1901.

Application filed August 7, 1901. Serial No. 71,250. (No specimens.)

*To all whom it may concern:*

Be it known that I, HANS A. FRASCH, a citizen of the United States, residing at Hamilton, in the county of Wentworth and Province of Ontario, Canada, have invented a certain new and useful Improvement in Processes of Producing Nickel Salts, of which the following is a full, clear, and exact description.

This invention relates to the separation of a nickel-ammonium compound, as described and claimed in United States Letters Patent granted to me, No. 669,899, dated March 12, 1901. In the patent referred to I have set forth the separation of nickel from copper, cobalt, zinc, and other metals whose hydroxids are soluble in ammonia by saturating a solution of a salt of these metals with ammonia in excess and precipitating the nickel-ammonium salt by the addition thereto of a salt capable of displacing it. I have discovered that the nickel can also be separated from other metals by treating the oxids or hydroxids with ammonia and then adding common salt or any other salt capable of displacing the nickel-ammonium salt.

To carry out my process, I precipitate the metals contained in a nickel-bearing solution in form of their hydroxids by the addition thereto of a suitable reagent, such as an alkali, calcium hydrate, or other alkaline earth. The hydroxids thereby precipitated are separated from the solution by means of filtration or otherwise. These hydroxids are then treated with a solution of ammonia or with a salt of ammonia, such as ammonium chlorid or sulfate, which is capable of reacting with the hydroxids to liberate free ammonia, and thereby all the metals whose hydroxids are soluble in ammonia are brought into solution and separated from the insoluble residuum, such as iron, by filtration. To this ammoniacal solution bearing all the metals whose hydroxids are soluble in ammonia I add common salt, upon the addition of which the nickel-ammonium salt precipitates, it being insoluble in ammoniated salt-brine.

The analysis of the salt obtained by this method shows: nickel, 17.5; ammonium, (combined,) 19; ammonia, (free,) 21.3; chlorin, 42.1; total, 99.9. This nickel-ammonium salt on present determination corresponds to the chemical formula $$Ni(NH_3)2Cl_2 + 4NH_3 + 2NH_4Cl.$$

The two equivalents of chlorin and ammonia present in this salt above the one expressed in my Patent No. 669,899, above referred to, are due originally to the presence of sodium hydrate, the reaction of this process being $$NiH_2O_2 + 6NH_3 + X - 2NaCl = Ni(NH_3)2Cl_2 + 4NH_3 + 2NaHO + XNaCl.$$

This double salt of ammonium nickle chlorid in presence of sodium hydrate and water undergoes a secondary reaction, viz:

$$Ni(NH_3)2Cl_2 + 2NaHO + 2H_2O = NiH_2O_2 + 2NH_4Cl + 2NaHO.$$

Reaction between the ammonium chlorid and caustic soda is avoided by the further addition of ammonia and salt, the final product then obtained being insoluble in ammoniated salt brine.

The product as obtained by this process in the presence of water is unstable and upon standing in solution separates nickel hydroxid, the sodium reverting to the chlorid. The reactions above stated offer a means of producing sodium hydrate from sodium chlorid, and I hereby reserve the right to make application for Letters Patent for this process in so far as it can be applied to the manufacture of caustic soda.

What I claim is—

1. The process of producing a nickel-ammonium salt, which consists in dissolving an oxid of nickel in a solution of ammonia and precipitating the nickel-ammonium salt by the addition of a salt capable to displace it.

2. The process of separating nickel from copper and other metals, which consists in bringing the metals into solution, precipitating the hydroxids by the addition of a suitable reagent, dissolving the hydroxids which are soluble in ammonia in a solution of ammonia and precipitating the nickel from this solution by the addition thereto of a salt capable of displacing the nickel.

3. The process of separating nickel from copper and other metals, which consists in bringing the metals into solution, precipitating the hydroxids by the addition of alkaline earth, dissolving the hydroxids which are soluble in ammonia in a solution of ammonia and precipitating the nickel from this solution by the addition thereto of a salt capable of displacing the nickel.

4. The process of separating nickel from copper and other metals, which consists in bringing the metals into solution, precipitating the hydroxids by the addition of a suitable reagent, dissolving the hydroxids which are soluble in ammonia in a solution of ammonia and precipitating the nickel by the addition of sodium chlorid.

In testimony whereof I have hereunto set my hand this 22d day of July, A. D. 1901.

HANS A. FRASCH.

Witnesses:
A. M. HERRIMAN,
M. E. CHERRIER.